(12) United States Patent
Telkowski et al.

(10) Patent No.: US 7,617,261 B2
(45) Date of Patent: *Nov. 10, 2009

(54) SYSTEM FOR ARCHIVE INTEGRITY MANAGEMENT AND RELATED METHODS

(75) Inventors: William A Telkowski, Lincoln University, PA (US); Sang F. Leong, Matawan, NJ (US)

(73) Assignee: JP Morgan Chase Bank, New York, NY (US)

( * ) Notice: Subject to any disclaimer, the term of this patent is extended or adjusted under 35 U.S.C. 154(b) by 602 days.

This patent is subject to a terminal disclaimer.

(21) Appl. No.: 11/417,582

(22) Filed: May 2, 2006

(65) Prior Publication Data
US 2006/0200508 A1    Sep. 7, 2006

Related U.S. Application Data

(63) Continuation of application No. 10/912,819, filed on Aug. 6, 2004, now Pat. No. 7,069,278.

(60) Provisional application No. 60/493,981, filed on Aug. 8, 2003.

(51) Int. Cl.
*G06F 17/30* (2006.01)
(52) U.S. Cl. .................. 707/204; 707/10; 707/202; 715/229
(58) Field of Classification Search ................ 707/204, 707/10, 202; 715/201, 229, 234; 709/203; 726/1, 4
See application file for complete search history.

(56) References Cited

U.S. PATENT DOCUMENTS 3,872,448 A    3/1975   Mitchell, Jr.
5,159,687 A    10/1992  Richburg (Continued)

FOREIGN PATENT DOCUMENTS

WO    WO 95/03586    2/1995

(Continued)

OTHER PUBLICATIONS

Hilbert; Hilbert, et al., An Approach to Large Scale Collection of Application Usage Data Over the Internet, Software Engineering 1998, Proceedings of the 1998 International Conference, Abstract, Apr. 1998.

(Continued)

*Primary Examiner*—Shahid A Alam
(74) *Attorney, Agent, or Firm*—Lowenstein Sandler PC

(57) ABSTRACT

A system for archive integrity management and related methods are disclosed. The invention includes one or more integrity manager applications, each of which monitor the integrity of an aspect of a data archive. Some integrity manager applications monitor the integrity of processes executed by the archive system, and other integrity manager applications monitor the integrity of communication paths in the archive system. A file input integrity manager application monitors the integrity of a plurality of processes associated with storing a new data file in the archive. A business content integrity manager application determines what documents are required for a transaction and monitors whether all of the required documents have been received by the archive system. Further, an event integrity manager application executes predetermined events triggered by characteristics of documents stored in the archive system and ensures that all events have been properly executed.

15 Claims, 12 Drawing Sheets

U.S. PATENT DOCUMENTS

| | | | |
|---|---|---|---|
| 5,168,444 A | 12/1992 | Cukor et al. | |
| 5,202,986 A | 4/1993 | Nickel | |
| 5,278,982 A | 1/1994 | Daniels et al. | |
| 5,313,616 A | 5/1994 | Cline et al. | |
| 5,347,518 A | 9/1994 | Lee | |
| 5,455,946 A | 10/1995 | Mohan et al. | |
| 5,471,613 A | 11/1995 | Banning et al. | |
| 5,471,629 A | 11/1995 | Risch | |
| 5,630,173 A | 5/1997 | Oprescu | |
| 5,701,471 A | 12/1997 | Subramanyam | |
| 5,748,878 A | 5/1998 | Rees et al. | |
| 5,752,034 A | 5/1998 | Srivastava | |
| 5,758,061 A | 5/1998 | Plum | |
| 5,764,972 A | 6/1998 | Crouse et al. | |
| 5,774,553 A | 6/1998 | Rosen | |
| 5,784,557 A | 7/1998 | Oprescu | |
| 5,787,402 A | 7/1998 | Potter et al. | |
| 5,813,009 A * | 9/1998 | Johnson et al. | 707/100 |
| 5,828,883 A | 10/1998 | Hall | |
| 5,832,523 A | 11/1998 | Kanai et al. | |
| 5,835,770 A | 11/1998 | Shum et al. | |
| 5,845,293 A | 12/1998 | Veghte et al. | |
| 5,872,976 A | 2/1999 | Yee et al. | |
| 5,907,846 A | 5/1999 | Berner et al. | |
| 5,920,719 A | 7/1999 | Sutton et al. | |
| 5,978,477 A | 11/1999 | Hull et al. | |
| 6,009,405 A | 12/1999 | Leymann et al. | |
| 6,012,087 A | 1/2000 | Freivald et al. | |
| 6,014,671 A | 1/2000 | Castelli et al. | |
| 6,026,237 A | 2/2000 | Berry et al. | |
| 6,029,002 A | 2/2000 | Afifi et al. | |
| 6,029,175 A | 2/2000 | Chow et al. | |
| 6,058,393 A | 5/2000 | Meier et al. | |
| 6,065,009 A | 5/2000 | Leymann et al. | |
| 6,081,808 A | 6/2000 | Blackman et al. | |
| 6,108,698 A | 8/2000 | Tenev et al. | |
| 6,125,390 A | 9/2000 | Touboul | |
| 6,138,112 A | 10/2000 | Slutz | |
| 6,138,158 A | 10/2000 | Boyle et al. | |
| 6,145,121 A | 11/2000 | Levy et al. | |
| 6,163,776 A | 12/2000 | Periwal | |
| 6,167,534 A | 12/2000 | Straathof et al. | |
| 6,185,576 B1 * | 2/2001 | McIntosh | 707/200 |
| 6,188,400 B1 | 2/2001 | House et al. | |
| 6,226,652 B1 | 5/2001 | Percival et al. | |
| 6,237,143 B1 | 5/2001 | Fontana et al. | |
| 6,243,862 B1 | 6/2001 | Lebow | |
| 6,256,635 B1 | 7/2001 | Arrouye et al. | |
| 6,263,121 B1 | 7/2001 | Melen et al. | |
| 6,266,683 B1 | 7/2001 | Yehuda et al. | |
| 6,269,479 B1 | 7/2001 | Puram | |
| 6,279,008 B1 | 8/2001 | Tung Ng et al. | |
| 6,301,701 B1 | 10/2001 | Walker et al. | |
| 6,311,320 B1 | 10/2001 | Jibbe | |
| 6,311,327 B1 | 10/2001 | O'Brien et al. | |
| 6,336,122 B1 | 1/2002 | Lee et al. | |
| 6,356,920 B1 | 3/2002 | Vandersluis | |
| 6,381,609 B1 | 4/2002 | Breitbart et al. | |
| 6,385,618 B1 | 5/2002 | Ng et al. | |
| 6,397,221 B1 | 5/2002 | Greef et al. | |
| 6,405,209 B2 | 6/2002 | Obendorf | |
| 6,411,957 B1 | 6/2002 | Dijkstra | |
| 6,418,446 B1 | 7/2002 | Lection et al. | |
| 6,418,448 B1 | 7/2002 | Sarkar | |
| 6,418,451 B1 | 7/2002 | Maimone | |
| 6,449,623 B1 | 9/2002 | Bohannon et al. | |
| 6,453,310 B1 | 9/2002 | Zander | |
| 6,456,995 B1 | 9/2002 | Salo et al. | |
| 6,467,052 B1 | 10/2002 | Kaler et al. | |
| 6,477,540 B1 | 11/2002 | Singh et al. | |
| 6,490,581 B1 | 12/2002 | Neshatfar et al. | |
| 6,502,095 B2 | 12/2002 | Breitbart et al. | |
| 6,502,104 B2 | 12/2002 | Fung et al. | |
| 6,532,467 B1 | 3/2003 | Brocklebank et al. | |
| 6,535,894 B1 | 3/2003 | Schmidt et al. | |
| 6,539,337 B1 | 3/2003 | Provan et al. | |
| 6,539,383 B2 | 3/2003 | Charlet et al. | |
| 6,539,397 B1 | 3/2003 | Doan et al. | |
| 6,539,398 B1 | 3/2003 | Hannan et al. | |
| 6,557,039 B1 | 4/2003 | Leong et al. | |
| 6,564,048 B1 | 5/2003 | Sugita | |
| 6,571,249 B1 | 5/2003 | Garrecht et al. | |
| 6,574,640 B1 | 6/2003 | Stahl | |
| 6,578,129 B1 | 6/2003 | da Silva Junior et al. | |
| 6,591,260 B1 | 7/2003 | Schwarzhoff et al. | |
| 6,601,075 B1 | 7/2003 | Huang et al. | |
| 6,643,652 B2 * | 11/2003 | Helgeson et al. | 707/10 |
| 6,651,076 B1 | 11/2003 | Asano | |
| 6,665,086 B2 | 12/2003 | Hull et al. | |
| 6,678,705 B1 | 1/2004 | Berchtold et al. | |
| 6,681,380 B1 | 1/2004 | Britton et al. | |
| 6,691,139 B2 | 2/2004 | Ganesh et al. | |
| 6,697,835 B1 | 2/2004 | Hanson et al. | |
| 6,701,514 B1 | 3/2004 | Haswell et al. | |
| 6,711,594 B2 | 3/2004 | Yano et al. | |
| 6,714,219 B2 | 3/2004 | Lindhorst et al. | |
| 6,721,747 B2 * | 4/2004 | Lipkin | 707/10 |
| 6,763,384 B1 | 7/2004 | Gupta et al. | |
| 6,880,010 B1 | 4/2005 | Webb et al. | |
| 6,918,013 B2 | 7/2005 | Jacobs et al. | |
| 6,920,467 B1 | 7/2005 | Yoshimoto | |
| 6,934,934 B1 | 8/2005 | Osborne, II et al. | |
| 6,938,072 B2 | 8/2005 | Berman et al. | |
| 7,007,299 B2 * | 2/2006 | Ioele et al. | 726/14 |
| 7,010,757 B2 | 3/2006 | Stana et al. | |
| 7,290,275 B2 * | 10/2007 | Baudoin et al. | 726/1 |
| 2002/0007287 A1 | 1/2002 | Straube et al. | |
| 2002/0010708 A1 * | 1/2002 | McIntosh | 707/200 |
| 2002/0029228 A1 | 3/2002 | Rodriguez et al. | |
| 2002/0038226 A1 | 3/2002 | Tyus | |
| 2002/0038320 A1 | 3/2002 | Brook | |
| 2002/0049666 A1 | 4/2002 | Reuter et al. | |
| 2002/0065695 A1 | 5/2002 | Francoeur et al. | |
| 2002/0083034 A1 | 6/2002 | Orbanes et al. | |
| 2002/0091702 A1 | 7/2002 | Mullins | |
| 2002/0116205 A1 | 8/2002 | Ankireddipally et al. | |
| 2002/0143774 A1 | 10/2002 | Vandersluis | |
| 2002/0144101 A1 | 10/2002 | Wang et al. | |
| 2002/0178439 A1 | 11/2002 | Rich et al. | |
| 2002/0188765 A1 | 12/2002 | Fong et al. | |
| 2003/0014421 A1 | 1/2003 | Jung | |
| 2003/0018666 A1 | 1/2003 | Chen et al. | |
| 2003/0027561 A1 | 2/2003 | Iyer | |
| 2003/0046313 A1 | 3/2003 | Leung et al. | |
| 2003/0050931 A1 | 3/2003 | Harman et al. | |
| 2003/0065644 A1 | 4/2003 | Horman et al. | |
| 2003/0069975 A1 | 4/2003 | Abjanic et al. | |
| 2003/0070158 A1 | 4/2003 | Lucas et al. | |
| 2003/0088593 A1 | 5/2003 | Stickler | |
| 2003/0126151 A1 | 7/2003 | Jung | |
| 2003/0131007 A1 | 7/2003 | Schirmer et al. | |
| 2003/0140045 A1 | 7/2003 | Heninger et al. | |
| 2003/0140308 A1 | 7/2003 | Murthy et al. | |
| 2003/0145047 A1 | 7/2003 | Upton | |
| 2003/0163603 A1 | 8/2003 | Fry et al. | |
| 2003/0167266 A1 | 9/2003 | Saldanha et al. | |
| 2003/0167445 A1 | 9/2003 | Su et al. | |
| 2003/0177118 A1 | 9/2003 | Moon et al. | |
| 2003/0177341 A1 | 9/2003 | Devillers | |
| 2003/0191849 A1 | 10/2003 | Leong et al. | |
| 2003/0217033 A1 | 11/2003 | Sandler et al. | |
| 2003/0217083 A1 | 11/2003 | Taylor | |
| 2003/0218633 A1 | 11/2003 | Mikhail et al. | |
| 2004/0060006 A1 | 3/2004 | Lindblad et al. | |

| | | | |
|---|---|---|---|
| 2004/0122872 | A1 | 6/2004 | Pandya et al. |
| 2005/0027658 | A1 | 2/2005 | Moore et al. |
| 2005/0060345 | A1 | 3/2005 | Doddington |
| 2005/0065987 | A1 | 3/2005 | Telknowski et al. |

FOREIGN PATENT DOCUMENTS

| | | |
|---|---|---|
| WO | WO 96/34350 | 10/1996 |
| WO | WO 02/46980 | 6/2002 |

OTHER PUBLICATIONS

Quantitative Monitoring of Software Development by Time-Based and Intercheckpoint Monitoring, Software Engineering Journal, vol. 5, Iss. 1, p. 43-49, Abstract, Jan. 1990.

Duggan; 2.40 General—Reviews and Abstracts, SPI Database of Software Technologies, p. 1-5, Feb. 1, 1974.

Vanbommel; Genetic Algorithms for Optimal Logical Database Design Information and Software Technology, vol. 36, No. 12, p. 725-732, 1994.

Hellerstein; A Generalized Search Tree for Database Systems, Jan. 19, 1996.

Chen et al.; Improving Index Performance Through Prefetching School of Computer Science Carnegie Mellon University, Dec. 2000.

Moser; Transactions in a Distributed Object Environment, Department of Electrical and Computer Engineering, Jun. 19, 2005.

Strom et al.; Gryphon: An Information Flow Based Approach to Message Brokering, International Symposium on Software Reliability, Jun. 20, 2005.

Deng et al.; A Probabilistic Approach to Fault Diagnosis in Linear Lighwaves Network, Department of Electrical Engineering, May 1992, pp. 1-122.

McConnell; Gauging Software Readiness With Defect Tracking; IEEE: May/Jun. 1997.

Jagadish et al; Tax: A Tree Algebra for XML; University of Michigan, Ann Arbor, MI; pp. 149-164; 2002.

Jagadish et al.; Timber: A Native XML Database; The VLDB Journal (2002); pp. 274-291; Published Online Dec. 19, 2002.

Yu, et al.; An Analysis of Several Software Defect Models; IEEE Transactions on Software Engineering, vol. 14., No. 9; Sep. 1988.

Computer Dictionary Online, Definition of Cache, Retrieved From Computer-Dictionary-Online.org, 2 Pages, 2007.

Microsoft Press Computer Dictionary, Third Edtion, Definition of Cache, 1997.

"Efficient Tree Pattern Matching", by S.R. Kosaraju 30th Annual Symposium on Foundations of Computer Science, 1989, Publication Date: Oct. 30, 1989, pp. 178-183, ISBN: 0-8186-1982-1.

"A System for Approximate Tree Matching", by Wang et al., IEEE Transactions on Knowledge and Data Engineering, vol. 6 No. 4, Aug. 1994, pp. 559-571.

"Efficiently Mining Frequent Trees in a Forest", by Zaki, SIGKDD 2002 Edmonton, Alberta, Canada, Jul. 23-26, 2002.

Hacigumus, Hakan et al., "Executing SQL over Encrypted Data in the Database-Service-Provider Model", Jun. 2002, ACM Sigmod, pp. 216-227.

Chen, Peter, "The Entity-Relationship-Model—Toward a Unified View of Data", Mar. 1976, ACM Transactions on Database Systems, vol. 1, No. 1, pp. 9-36.

"Schema: Definition, Synonyms from Answers.com" http://www.answers.com/schema Answers Corporation, 2008.

"Database schema: Information from Answers.com" http://www.answers.com/topic/database-schema-technology Answers Corporation, 2008.

* cited by examiner

SYSTEM FOR ARCHIVE INTEGRITY MANAGEMENT AND RELATED METHODS

CROSS-REFERENCE TO RELATED APPLICATION

This application is a continuation of U.S. patent application Ser. No. 10/912,819, filed on Aug. 6, 2004 now U.S. Pat. No. 7,069,278, currently allowed, which claims the benefit of U.S. Provisional Application No. 60/493,981, filed Aug. 8, 2003. The entire disclosures of both applications are hereby incorporated herein by reference.

FIELD OF THE INVENTION

This invention relates to the field of data archiving systems, and, more specifically, to ensuring the integrity of archive system operation. In particular, the archive system according to the present invention ensures the integrity of file transfer, data migration, data destruction, data retrieval, and data input processes. The inventive archive system also ensures the integrity of communication paths and data retrieval paths. Further, this invention discloses solutions for identifying necessary documents for predetermined transaction types and ensuring that all documents associated with an instance of a transaction type have been received. Additionally, this invention reveals solutions for scheduling and executing events triggered by characteristics of the documents stored in an archive system according to the invention.

BACKGROUND OF THE INVENTION

Digital archives are central information repositories often used by large corporations for storing or backing-up critical business documents for extended periods. Because these archived digital documents support essential business operations, it is imperative that their content be accurately maintained. Conventional schemes attempt to protect against corruption of data by performing a data integrity check at the point where data is received by the archive system. For instance, when a data file is transferred to the archive system, a cyclic redundancy check ("CRC") may be performed to ensure that the file was received by the archive system successfully.

However, errors may occur in the archive system at many other places in the archive system besides at the input interface, and not all errors are data transfer errors. While a CRC may provide information about one type of error occurring at one point in the archive system, it provides little or no information about non-file transfer errors, errors located at different points in the archive system, or why errors occur. For instance, an error may not have occurred at an input interface, but may have occurred while storing the file to a storage medium. Further, a CRC may detect an error that occurs at an input interface, but does not detect what may be the cause of the error. Additionally, a CRC fails to detect non-file transfer errors, such as an error that may occur when a document scheduled for destruction fails to be destroyed.

Because data integrity is of utmost importance in an archive system, a need exists in the art for a comprehensive solution that ensures the integrity of all processes performed by an archive system.

SUMMARY OF THE INVENTION

This problem is addressed and a technical solution achieved in the art by a system for archive integrity management and related methods. The system includes one or more integrity manager applications, each of which monitor the integrity of an aspect of the archive. Some integrity manager applications monitor the integrity of processes executed by the archive system, such as file transfer, document migration, document destruction, and document retrieval processes. Other integrity manager applications monitor the integrity of communication paths in the archive system, such as communication lines and the document retrieval path. A file input integrity manager application monitors the integrity of a plurality of processes associated with storing a new data file in the archive. A business content integrity manager application determines which documents are required for a transaction and monitors whether all of the required documents have been received by the archive system. Further, an event integrity manager application executes predetermined events triggered by characteristics of documents stored in the archive system and ensures that all events have been properly executed.

By monitoring the integrity of a wide range of aspects of an archive system, the goal of ensuring complete data integrity in the archive system is thoroughly fulfilled.

BRIEF DESCRIPTION OF THE DRAWINGS

A more complete understanding of this invention may be obtained from a consideration of this specification taken in conjunction with the drawings, in which.

DETAILED DESCRIPTION OF THE EXEMPLARY EMBODIMENTS OF THE INVENTION

The archive management system according to the present invention ensures that a data archive is functioning properly by monitoring a variety of different aspects of the operation of the data archive. By monitoring these different aspects, more details about an error may be compiled, such as the type of error that occurred, where the error occurred, and why it occurred.

Figure 1:
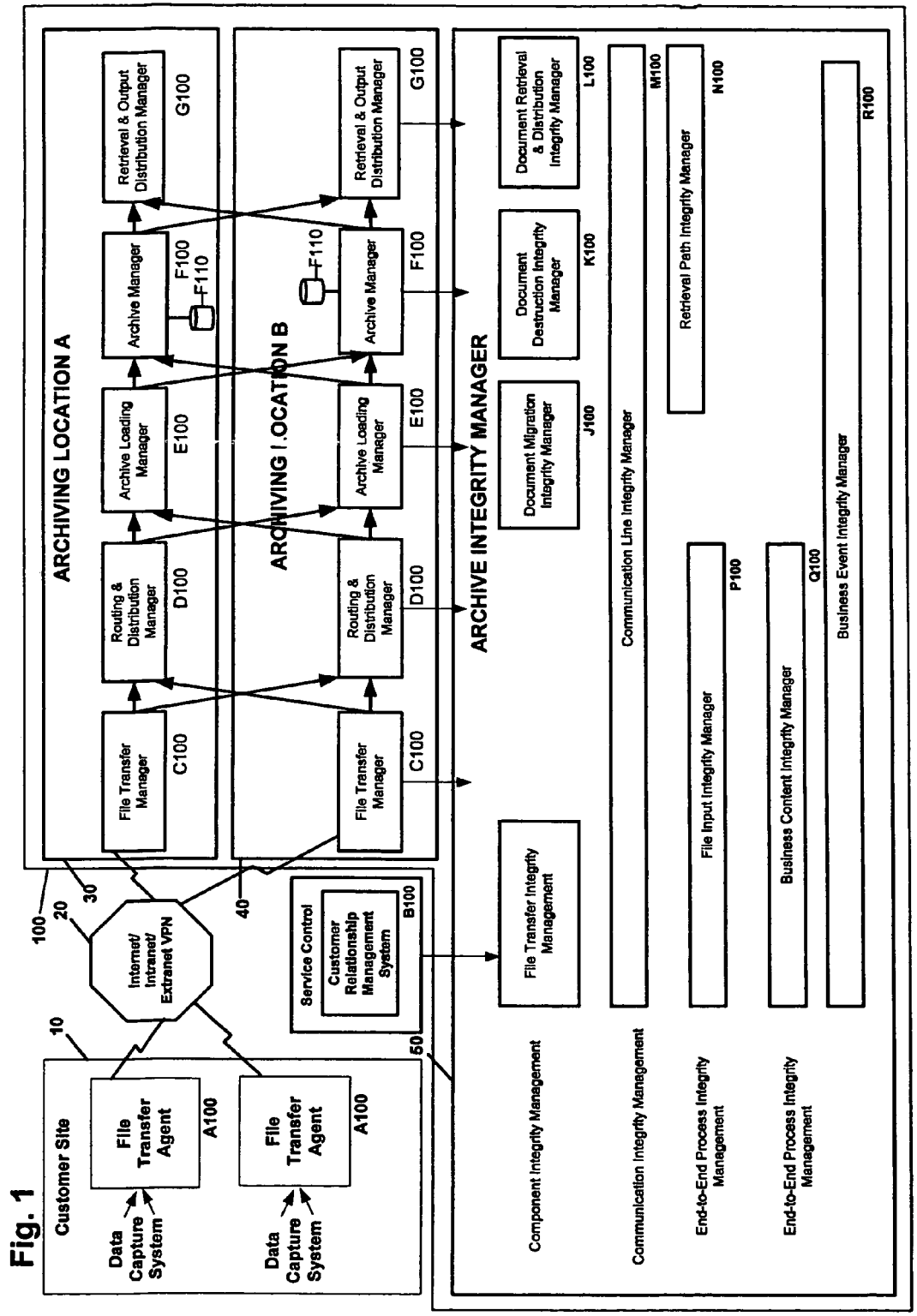
FIG. 1 illustrates an architecture of the archive system according to an embodiment of the invention.

FIG. 1 illustrates an architecture of a data archive system 100 according to an exemplary embodiment of the present invention. The data archive system 100 includes archiving locations 30, 40 responsible for storing and retrieving files to and from an archive F110. The archive F110 may include one ore more storage media and may be distributed over various locations, as shown by archiving location A 30 and archiving location B 40. The data archive system 100 also includes an archive integrity system 50 that monitors the operation of the archiving locations 30, 40.

Each box shown within the data archive system 100 represents a computer program, or "application," that instructs a computer to perform the functions associated with the box. Although shown separately, one skilled in the art will appreciate that the applications may be implemented by a single program. Further, although the archiving locations 30, 40 and the archive integrity system 50 are depicted separately, they may be integrated. For example, the archive integrity system 50 may be implemented using a single computer program operated on a single computer at each of the archiving locations 30, 40, where each computer includes a portion of the archive F110. Alternatively, the archive integrity system 50 may be operated on a computer separate from computers executing the applications controlling archiving locations 30, 40. In this situation, the computer executing the archive integrity system 50 may monitor operation of the computers executing the applications controlling the archiving locations 30, 40 remotely. Accordingly, one skilled in the art will appreciate that the invention is not limited to the computer arrangement illustrated herein.

The archiving locations 30, 40 are shown in two parts: archiving location A 30 and archiving location B 40, to illustrate that a single data archive may include one or more separate archiving locations. Each of the archiving locations include a portion of the total storage capacity of the single data archive. In the illustration of FIG. 1, two archive portions F110 are shown that, together, make up the single data archive.

Further, archiving location A 30 and archiving location B 40 may together represent a primary archive. Although not shown in FIG. 1, one or more secondary archives having a structure the same as or similar to archiving locations A 30 and B 40 may also be used for redundancy and enhanced disaster protection. For example, an archiving location "AA" and "BB" may exist which mirror, or "back-up," the contents of archiving locations A 30 and B 40, respectively.

The manner in which the archiving locations 30, 40 receive, store, and retrieve a data file will now be described. Customer site 10 represents a customer location that has files to be archived. Some of these files may already be in a computer-readable format, such as in an electronic document format. Files that are not in a computer-readable format, such as a paper file, are converted into a computer-readable format by any data capture system known in the art, such as a scanner. Although capturing is shown as occurring at a remote customer site 10, one skilled in the art will appreciate that the invention is not limited to such an arrangement.

Once all of the files queued for archiving have been converted into a computer-readable format, they are transmitted to the data archive system 100 using a File Transfer Agent ("FTA") A100. The customer site 10 is communicatively connected to the archiving locations 30, 40 via a network 20, which may include the Internet, an intranet, a virtual private network ("VPN"), a wide area network ("WAN"), or some other network connection known in the art. The File Transfer Agent A100 transfers the files by communicating via the network 20 with a File Transfer Manager application ("FTM") C100 of the archive system 100. The FTM C100 acts as an input interface to the a data archive system 100.

The FTA A100 can either be a generic industry product, such as file transfer protocol ("FTP"), or a custom product for added file transfer integrity control. The FTA A100 includes logic instructing it to send files to a backup FTM C100, archiving location B instead of A, for example, if it cannot reach the default FTM C100 after several transmission attempts. In situations where a failed attempt occurs, the FTA A100 stores information pertaining to the failed attempt in a local log file. This local log file is transmitted to the FTM C100 during the next successful transmission attempt.

The FTM C100 acts as a control server to the FTA A100 in managing the file transfer process. Prior to file transmission, the FTM C100 authenticates the FTA A100 by verifying an ID and password. After authentication, incoming files are stored in one or more storage locations ("sub-directories") assigned to the customer. These sub-directories may be local to the FTM C100 (archiving location A 30, for example) or remote (archiving location B 40, for example). The FTM C100 uses one or more error detection techniques, such as a Cyclic Redundancy Check ("CRC"), to verify that the files are being transferred accurately. Files may be transferred in fixed-size blocks to facilitate retransmission in the case of an error. The FTM C100 also collects and logs file transfer operation audit trails for downstream process monitoring, including communication problems between the FTA A100 and the FTM C100. As will be discussed, the transmission log (C120 in FIG. 2) maintained by the FTM C100 is used by the File Transfer Integrity Manager H100.

After the FTM C100 stores the incoming files into the appropriate sub-directories, one or more Routing and Distribution Manager applications ("RDM") D100 located at each archiving location 30, 40 monitor the sub-directories for new files. The RDMs may monitor the sub-directories asynchronously according to their own time-based polling scheme. When a new file is located in one of the sub-directories, an RDM D100 distributes the file to an Archive Loading Manager application ("ALM") E100 responsible for adding the file to the archive. Multiple ALMs E100 may be located at each archiving location 30, 40. However, according to an exemplary embodiment each incoming file is serviced by a single ALM E100.

Each ALM E100 has a queue to which the RDMs D100 add incoming files. The ALMs E100 may process their queues in a sequential manner and may add the files to local or remote archives F110. Every time a file is added to the archive F110 by an ALM E100, the file is validated to ensure that it has been accurately stored, such as by performing a CRC, or a bitwise or other content comparison. When an incoming file to be stored is a computer generated report file, it is parsed and indexed based upon pre-defined indexing rules. Example indexing rules in this situation may include identifying the locations of the report title, report date, and section and page breaks. Other file types, besides report files, may also be indexed to identify the locations of titles, section breaks, page breaks, or other document characteristics. Once indexed, a document index database is updated with such information. The file itself is stored on one or more storage media, such as a magnetic disk, optical disk, or magnetic tape of the archive F110. The ALM E100 then updates an operation log file (E120, FIG. 8) as an audit trail that facilitates process integrity management and performance measurement.

An Archive Manager application ("AM") F100 manages and maintains the index databases and the document storage on the various storage media making up the data archive F110. Prior to the end of the useful lifetime of the storage media, the AM F100 manages the migration from old storage media to new storage media. Such media migration may be initiated due to: degradation of the physical or magnetic property of the storage media, elapsing of the manufacturer's stated useful lifetime of the storage media, or the storage media becoming obsolete. When the AM F100 performs a media migration, it stores the details of such migration in a migration log file J130 as an audit trail, discussed below with reference to FIG. 3. The AM F100 also conducts document destruction, e.g., upon the end of a defined retention period.

Document retrieval from the archive is managed by a Retrieval and Output Distribution Manager application ("RODM") G100. The RODM G100 is responsible for outputting copies of selected files from the archive F110. The RODM G100 validates the retrieved files to ensure that they are identical to the corresponding file stored in the archive F110 and updates an operation log file (L130, FIG. 5) as an audit trail.

Having described the process of capturing a document for archiving, storing it in the archive F110, and retrieving it therefrom, the archive integrity system 50 will now be described. The File Transfer Integrity Manager application ("FTIM") H100 of the archive integrity system 50 will be described first with reference to FIG. 2. The FTIM H100 controls the processes and data objects shown in FIG. 2 whose reference symbols begin with the letter "C." The FTIM H100 monitors operation of the FTM C100 and validates the integrity of the document files C110 received from the FTA A100.

Controlled by the FTIM H100, the FTM C100 receives document files C110 and stores them in their appropriate sub-directories, as discussed with reference to FIG. 1. For each document transfer, or attempted transfer, the FTM C100 updates the transmission log C120 as an audit trail. The transmission log C120 is frequently checked for new entries by a capture integrity control information process C130. For each new entry in the transmission log C120, the process C130 retrieves: an identifier for the FTA A100 and the FTM C100 involved in the file transfer associated with the entry; a customer identifier; a date and time of transfer initiation and completion; the incoming file name; the incoming file size in bytes; the staging sub-directory path name where the file was stored; and the status of the transfer, such as success or an error code. This information is then stored in a file transfer integrity database C150. It should be noted that the term "database" is used to refer to a stored set of related data. For instance, the file transfer integrity database C150 may comprise a relational database system supporting SQL commands or simply a text file comprising a series of records.

As a comparison to the data retrieved and stored by the process C130, another integrity control module C140 receives information from a Customer Relationship Management system ("CRM") B100. The CRM B100 may include a Web-based input form that allows the customer to enter an expected input file transmission schedule for each FTA A100. The expected input schedules may be manually generated, generated from an automated system, or created from the file transfer integrity database C150 using historical file transfer frequency patterns.

Information contained in the expected input schedules may include: an identifier for the FTA A100 used for the transmission; identifiers for the primary and secondary FTMs C100; the transmission frequency, such as ad hoc, hourly, daily, weekly, etc., along with time-of-day, day-of-week, etc.; a frequency predictability rating; and information regarding the files to be transmitted, such as name of file, size of file, etc. The predictability rating indicates an expected variance between the scheduled transmission frequency and the actual transmission frequency.

The expected schedule information is received by the process C140 and stored in the file transfer integrity database C150. Any differences between the expected schedule information and the information from the transmission log C120 can result in a notification signal or an alert being transmitted via an output interface, which may be connected to a user-interface Z100. In the exemplary embodiment, the user-interface is an Integrity Manager Dashboard Z100, described in detail below with reference to FIG. 12.

Figure 3:
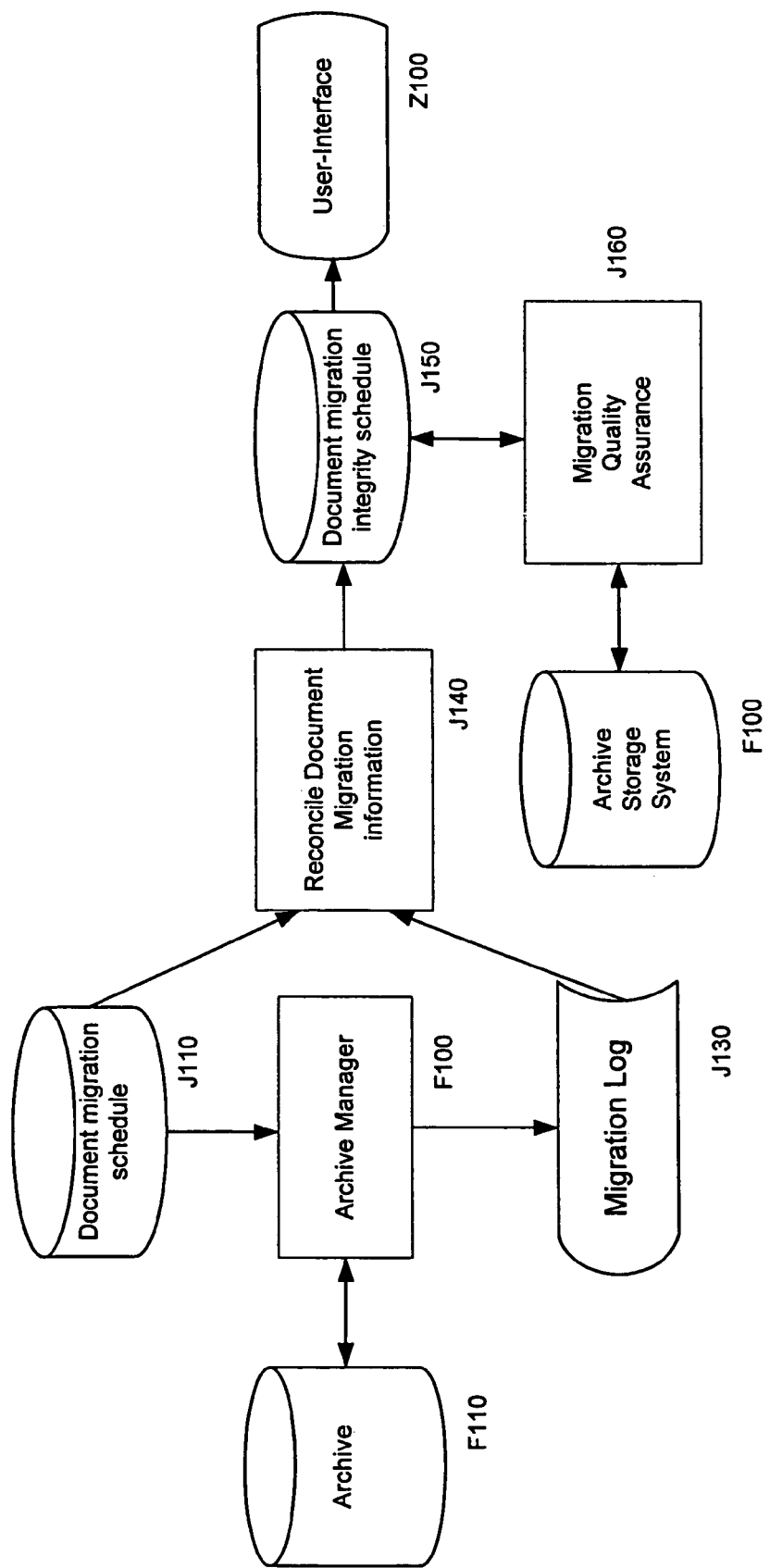
FIG. 3 illustrates the document migration integrity manager application shown in FIG. 1 according to an embodiment of the invention.

Turning now to FIG. 3, the Document Migration Integrity Manager application ("DMIM") J100 of FIG. 1 will be described. The DMIM J100 controls the processes and data objects shown in FIG. 3 whose reference symbols begin with the letter "J." The DMIM J100 verifies that any migration event performed by the Archive Manager F100 occurs successfully. When it is determined that a document migration is to occur, a migration schedule J110 is created. The migration schedule J110 may include an identification of the storage medium to be migrated ("old storage medium"); a file name and byte-count for each file on the old storage medium; the type of migration, e.g., physical media migration and/or file reformatting; and other details about the migration. If the migration is a file format change, then the original and target file types are specified, such as TIFF 2.0 to TIFF 6.0.

The Archive Manager F100 accesses the migration schedule J110 and the archive storage system F110 to execute the migration event. Details of the event are stored in the migration log file J130 as an audit trail and to facilitate performance measurement. Each migration event is recorded in the log file J130 with information that may include: an identification of the old storage medium; an identification of the new storage medium, a file name and byte-count for each file on the new storage medium, and a date and time that the migration was completed.

After the Archive Manager F100 completes a migration, the DMIM J100 reconciles the migration schedule J110 and the migration log J130, as shown at J140. The processing at J140 ensures that all storage media targeted for migration were migrated, and that all document files targeted for migration were migrated successfully. Successful migration of document files may be verified by comparing the file sizes both before and after the migration, if the file format remained the same.

The results from this reconcilement process are stored on the Media Migration Integrity Database J150 to support reporting. The information stored in the database J150 may include the information stored in the schedule J110 reconciled with the log J130; a migration status, such as success or an error code; and whether additional post-migration quality assurance tasks J160 have been completed.

Additional post-migration quality assurance tasks may include comparisons of document objects before and after migration. To perform these comparisons, the quality assurance tasks interface with the archive storage system F110. Such comparisons may include the extraction of plain text from each object both before and after the migration, and then matching the plain text. Another comparison method may be the creation of bit-maps for each object both before and after the migration, and then matching the bit-maps. Yet another comparison method be a side-by-side document display with a manual visual inspection.

Any number of methods or combinations of methods may be implemented at J160 to ensure that the migration was successfully performed. Migration quality assurance J160 may be based on a random sample of the migrated document objects or on all migration document objects. Results from the migration quality assurance process J160 are added to the Media Migration Integrity Database J150. Any quality assurance failures, either from the reconciliation process J140 or the quality assurance process J160 may result in a notification signal or an alert being transmitted via an output interface, which may be connected to a user-interface Z100 to notify an operator.

Figure 4:
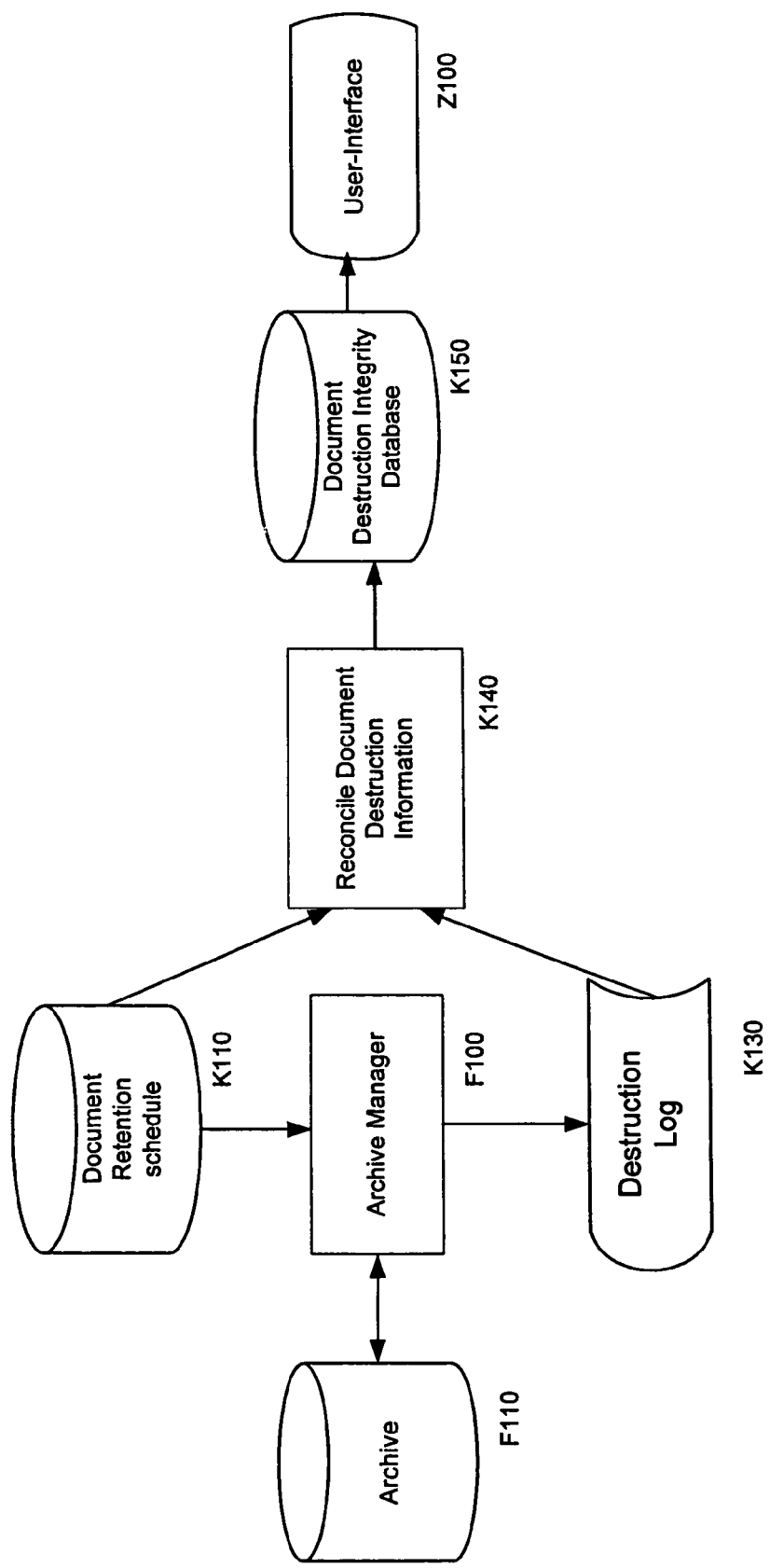
FIG. 4 illustrates the document destruction integrity manager application shown in FIG. 1 according to an embodiment of the invention.

Turning now to FIG. 4, the Document Destruction Integrity Manager application ("DDIM") K100 from FIG. 1 will be described. The DDIM K100 controls the processes and data objects shown in FIG. 4 whose reference symbols begin with the letter "K." The DDIM K100 ensures that documents scheduled for deletion are properly deleted.

Based on predetermined "purge" rules specifying how long documents of particular types should be retained prior to destruction, a document retention schedule K110 is generated. Examples of "purge" rules include retaining images of bank checks for seven years from the date of check presentment, or retaining loan documentation for a predetermined number of years from the date the loan is paid off. Examples of how the schedule K110 may be generated include using: information associated with the storage location of the files, such as all files in directory "X" will be retained until date "Y;" an Enterprise Record Management system, such as IBM DB2 CM Record Manager™; or an external system, such as an input file of recently paid off loans.

The Archive Manager F100 interfaces with the schedule K110 and the archive storage system F110 when performing document destruction. Document destruction may be performed by: deleting the index record(s) on an indexing database and the corresponding document object, typically by writing over the storage area with data (e.g. zeroes); deleting only the index record(s) on the index database with additional control measures to prevent direct reading of the document objects; or deleting the index records on the indexing database and physically destroying the storage media. For physical media destruction, the operator may also have to sign-on to the system to confirm execution of the media destruction event.

The Archive Manager F 100 also records details of each document destruction event to a destruction log K130. Such details may include: an identification of the storage system involved; the type of destruction performed, as discussed above; an identifier of the particular storage medium involved; the name of the document destroyed; the date and time of the destruction; the status of the destruction, e.g., successful or an error code; and an identifier of the operator involved.

Any differences between the document retention schedule K110 and the destruction log K130 are reconciled, as shown at K140. In particular, the data in the destruction log K130 is verified to ensure that document destruction has occurred according to the schedule K110. The results of the reconcilement are stored in a document destruction integrity database K150. Any differences between the schedule K110 and the log K130 may be communicated to an operator in the form of a notification signal or an alert displayed on a user-interface Z100.

Figure 5:
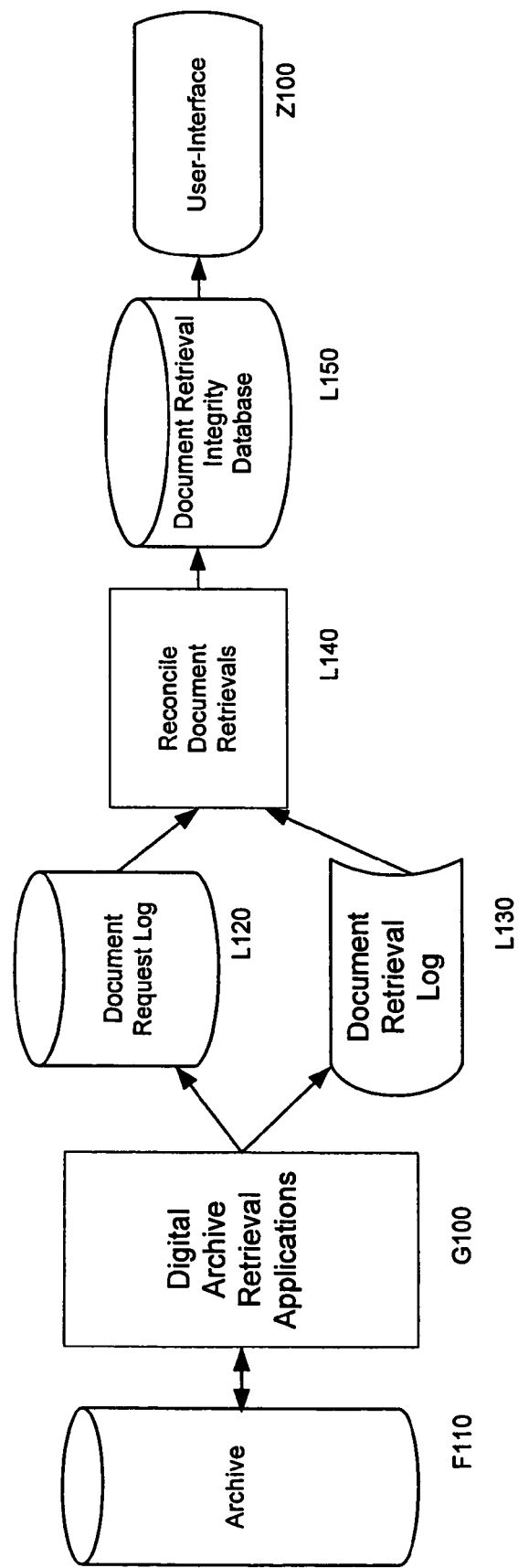
FIG. 5 illustrates the document retrieval integrity manager application shown in FIG. 1 according to an embodiment of the invention.

Turning now to FIG. 5, the Document Retrieval and Distribution Integrity Manager application ("DRDIM") L100 from FIG. 1 will be described. The DRDIM L100 controls the processes and data objects shown in FIG. 5 whose reference symbols begin with the letter "L." The DRDIM L100 ensures that documents retrieved from the archive storage system F110 via the Retrieval and Output Distribution Manager application G100 are retrieved properly.

A broad range of document retrieval applications G100 provide an end user with accessibility to documents stored in the archive storage system F110. Such retrieval applications may include Internet and intranet Web browser applications for ad hoc document retrievals; document workflow applications; bulk retrieval applications that request document objects in large numbers that are delivered via bulk printing, transmissions, CD-ROM, DVD, or magnetic tapes; or other business applications that integrate digital document contents from the archive storage system F110 via Application Programming Interfaces ("APIs") and Web Services, such as XML, SOAP, WSDL, and UDDI. Depending upon the storage medium on which a requested document is located, a request may be satisfied within sub-seconds, seconds, minutes, or hours.

Each incoming request is recorded in a document request log L120 at the time of the request. The information recorded for each request may include an identifier of the retrieval application from which the request was received; a date and time that the retrieval process is initiated; an assigned unique retrieval tracking identifier; an identifier of the archive storage subsystem that stores the requested file or files; a customer identifier; a user identifier; an identifier of the document requested; and whether the request indicates that the document format should be converted, such as converting an AFP format to PDF format.

Upon execution of the retrieval by the Retrieval and Output Distribution Manager application G100, the document retrieval event is recorded on a Document Retrieval Log L130 as an audit trail. The information recorded for each retrieval event may include the identifier of the retrieval application that retrieved the requested document(s); a date and time that the retrieval process completed; the assigned unique retrieval tracking identifier; the identifier of the archive storage subsystem that stores the requested file or files; the customer identifier; an identifier of the document requested; and a retrieval status, such as successful or an error code.

The contents of the document request log L120 and the document retrieval log L130 are reconciled to ensure retrieval process integrity, as shown at L140. In particular, each request record in the request log L120 is combined with each retrieval even L130 and stored in a document retrieval integrity database L150. This combination process may execute on a periodic basis.

The combined data in the database L150 is scanned to verify the integrity of the retrieval process. For instance, it is verified that each request in the request log L120 has a counterpart record having the same retrieval tracking identifier in the retrieval log L130. Also, a successful retrieval status for each retrieval event is verified. Further, the time between retrieval initiation, and retrieval completion, is calculated to ensure that it is below a threshold level. If a request record is missing a counterpart retrieval record, if any retrieval events failed, or if any retrieval event took longer than expected, an alert may be communicated to an operator via user-interface Z100.

Figure 6:
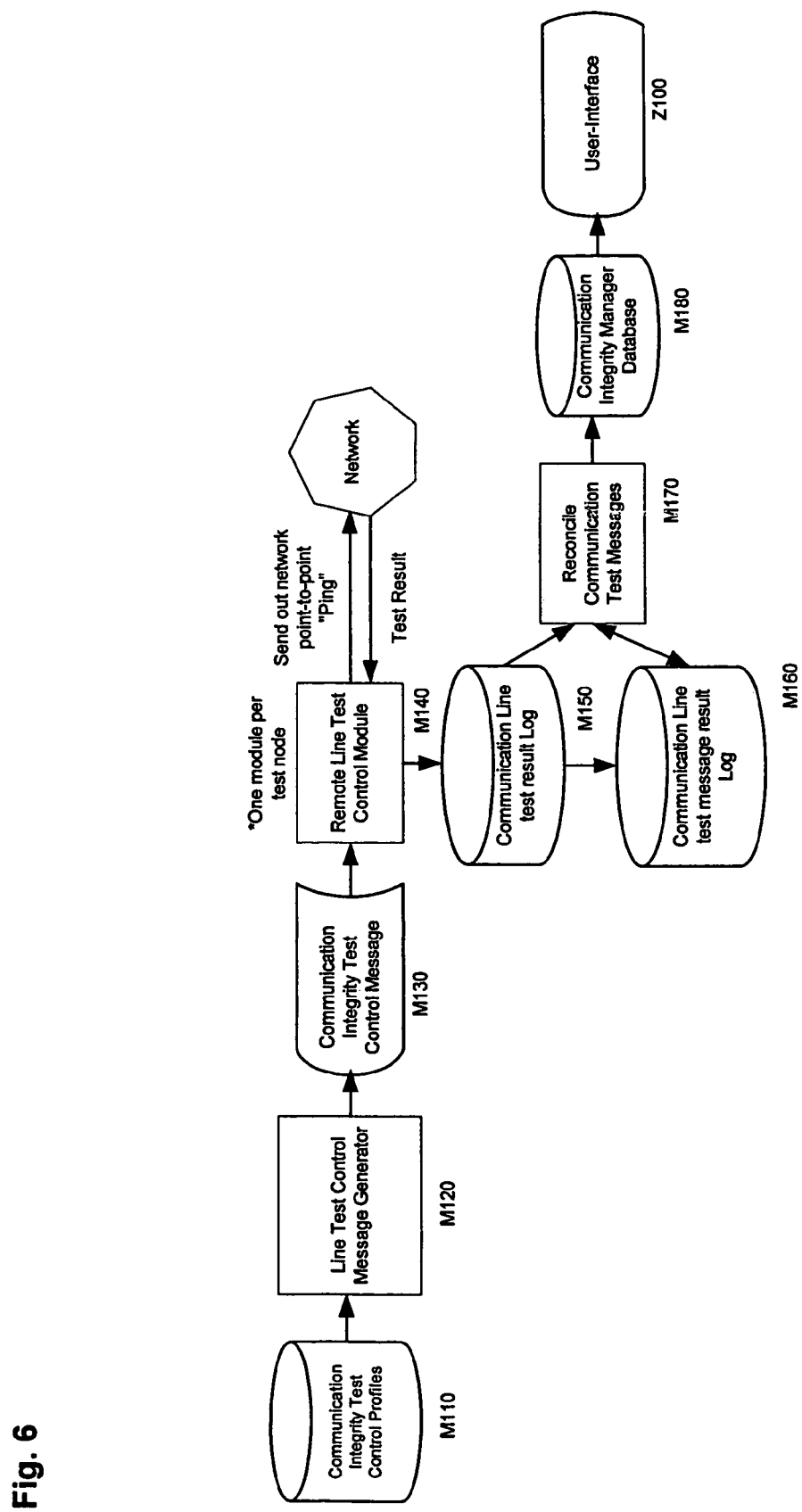
FIG. 6 illustrates the communication line integrity manager application shown in FIG. 1 according to an embodiment of the invention.

Turning now to FIG. 6, the Communication Line Integrity Manager application ("CLIM") M100 from FIG. 1 will be described. The CLIM M100 controls the processes and data objects shown in FIG. 6 whose reference symbols begin with the letter "M." Because one embodiment of the archive system 100 according to the present invention involves many geographically distributed hardware and software components communicating via complex networks of routers and communication lines, the CLIM M100 ensures that communication between these components occurs properly.

Communication Integrity Test Control Profile database M110 stores information regarding the communication tests to be performed. For each test, the database M110 specifies between which points in the archive system 100 is the test to be performed, e.g., from point A to point B; the type of test to be performed, e.g., network point-to-point "pings;" and the timing and frequency of test execution.

To perform a test from point A to point B, a Line Test Control Message Generator ("LTCMG") M120 generates a Communication Test Control Message M130 based on instructions from the database M110. The control message M130 is transmitted to a Remote Line Test Control Module ("RLTCM") M140, which is located at the test starting point, i.e., point A. The control message M130 instructs the RLTCM M140 as to the test particulars, which may include addresses the test starting and ending points, e.g., IP addresses of the RLTCM M140 at point A and the component at point B; the type of test to be performed, e.g., ping; and a location identifier for a Communication Line Test Result Log M150, to which test results are to be recorded. The control message M130 may also include other information, such as the date and time the control message M130 was created, a unique communication test control identifier, for use in the log M150, and an identifier of the LTCMG M120 that generated the control message M130. The LTCMG M120 records information pertaining to each generated control message M130 in a communication line test message log M160. The information recorded in the log M160 may be the same as that contained within the message M130.

The RLTCM M140 initiates a test upon receipt of the control message M130. When the control message M130 is received, the RLTCM M140 transmits a line test signal, such as a ping, to the test ending point, point B in this example. The results of the test are stored in the Communication Line Test Result Log M150. The information stored in the log M150 may include the date and time of test completion; the unique communication test control identifier; the identifier of the associated LTCMG M120; the test starting and ending points; the test status, such as success or an error code; and for each router hop or line segment involved, an address, such as an IP address, and a signal delay in milliseconds.

The data in the test result log M150 and the test message log M160 are reconciled, or matched and combined at M170, to ensure integrity of the tested communication lines. This matching process may occur periodically. The combined records are then stored in a communication integrity manager database M180.

The matching process at M170 verifies that a test occurred for each control message M120 generated by matching communication test control identifiers in each log M150 and the test message log M160. Further, it is determined whether each test was successful by checking the test statuses. Also, it is determined whether any unacceptable test durations occurred by checking the signal delay fields from the test result log M150. If any of these determinations indicate a test failure, an alert may be communicated to an operator via a user-interface Z100.

Figure 7:
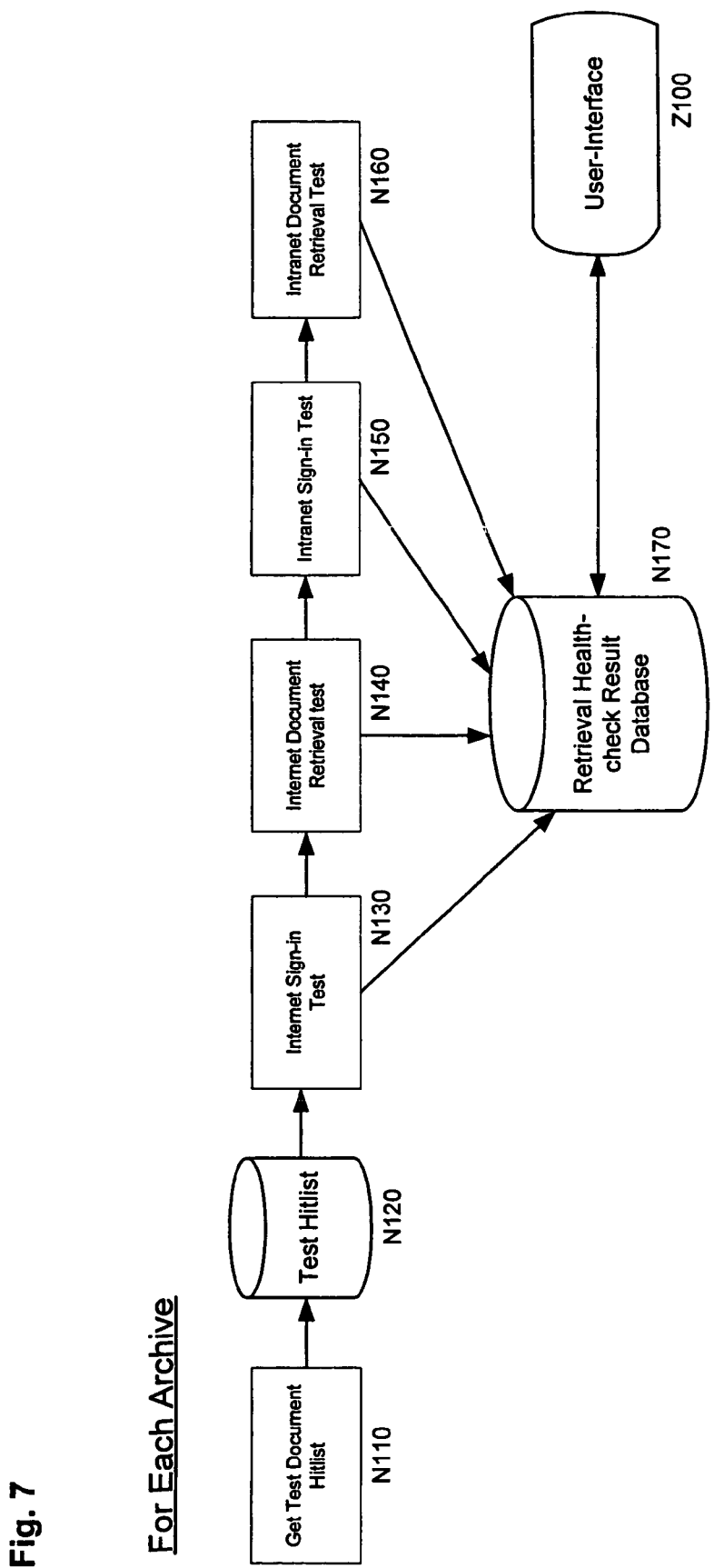
FIG. 7 illustrates the retrieval path integrity manager application shown in FIG. 1 according to an embodiment of the invention.

Turning now to FIG. 7, the Retrieval Path Integrity Manager application N100 ("RPIM") from FIG. 1 will be described. The RPIM N100 controls the processes and data objects shown in FIG. 7 whose reference symbols begin with the letter "N." The RPIM N100 ensures that the communication paths in the document retrieval path are working properly. The software components in FIG. 7, N110 and N130-N160, may be installed at each archiving location (30, 40 in FIG. 1, for example).

The Get Test Document Hitlist application N110 compiles a set of document identifiers, e.g., document names and locations, that will be used to test the retrieval path. Advantageously, the set of document identifiers includes documents stored on various types of media that require different retrieval techniques to more thoroughly test all aspects of document retrieval. For instance, a magnetic disk, a magnetic tape, and magneto-optical disks, are all accessed differently. Also, it is advantageous to select a document that is located in cache memory to test another aspect of document retrieval. The compiled set of test documents is stored in a Test Hitlist file N120.

Using the data in the hitlist file N120, several tests N130-N160 are performed. Tests N130 and N140 test the retrieval path with requests initiated from the Internet, and tests N150 and N160 test the retrieval path with a requests initiated from an intranet. Therefore, RPIM N100 tests the retrieval path by transmitting requests from different sources and by requesting documents stored on different types of media. One skilled in the art will appreciate that tests using requests initiated from other locations besides the Internet, or an intranet, may be used without departing from the scope of the invention. Further, although tests N130/N140 and N150/N160 are shown in a particular sequential order, they may occur in another order or may occur in parallel.

Test N130 logs into the archive system 100 via the Internet at a pre-defined frequency and determines whether the log-ins were successful. Test N140 requests, from the Internet, the documents in the hitlist file N120 at a predetermined frequency. It determines whether the requests were properly fulfilled. Test N150 logs into the archive system via an intranet at a pre-defined frequency and determines whether the log-ins were successful. And, test N160 requests, from the Internet, the documents in the hitlist file N120 at a predetermined frequency. Test N160 also determines whether the requests were properly fulfilled.

The results from each of the tests N130-N160 are stored in a Retrieval Health-Check Result Database N170. Information stored for each test may include the type of the test performed; an identifier of the application that performed the test; the date and time the test was initiated; an identifier of the particular Retrieval and Output Distribution Manager application G100, FIG. 1; that processed the request; the test duration; and the test status, such as successful or an error code. If the test duration exceeds some predetermined threshold value or if the test status indicates a failure, an alert may be communicated to an operator via user-interface Z100.

Figure 8:
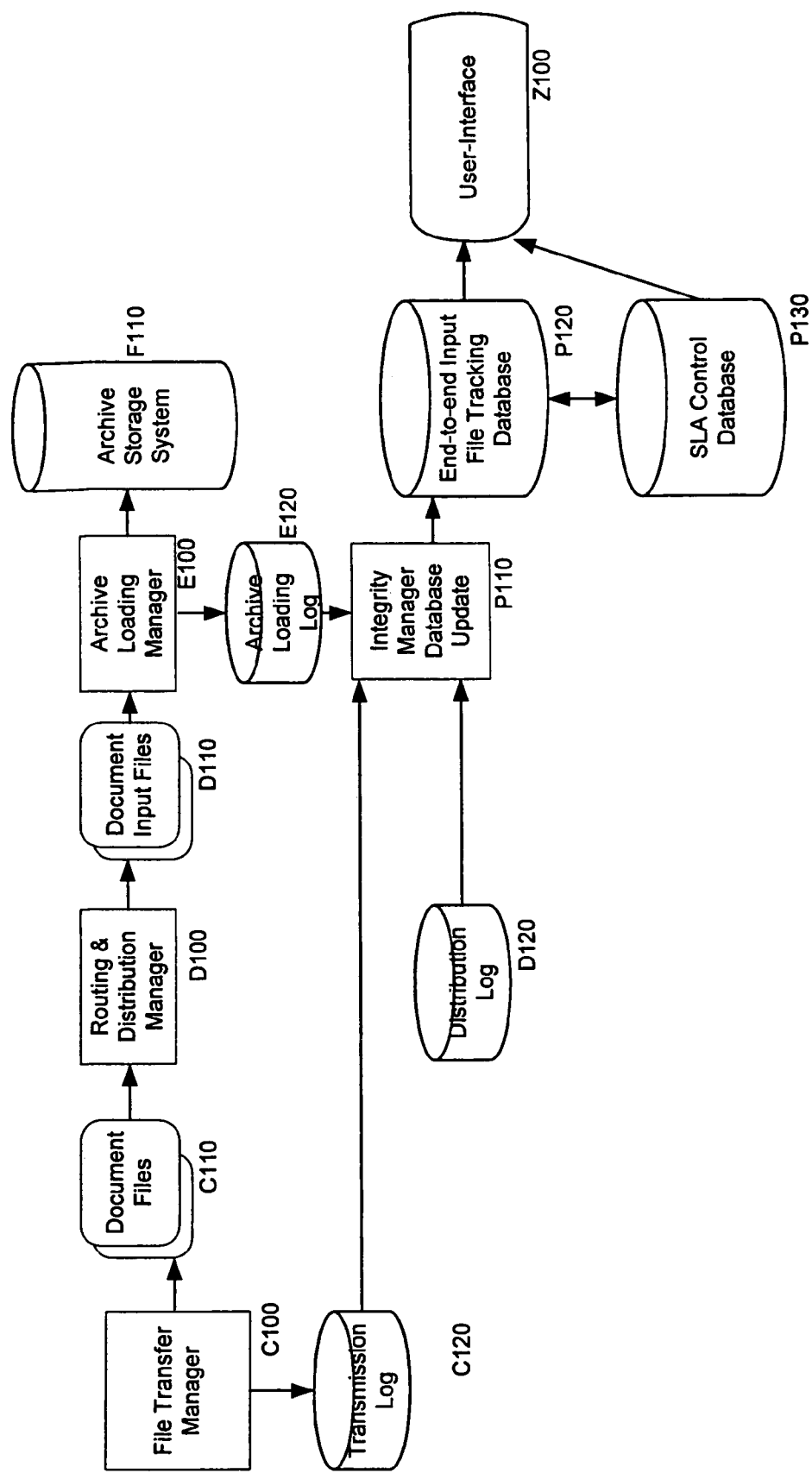
FIG. 8 illustrates the file input integrity manager application shown in FIG. 1 according to an embodiment of the invention.

Turning now to FIG. 8, the File Input Integrity Manager application ("FIIM") P100 from FIG. 1 will be described. The FIIM P100 controls the processes and data objects shown in FIG. 7 whose reference symbols begin with the letter "N." The FIIM P100 manages the end-to-end tracking, monitoring, and reconcilement of daily input files. It ensures that all input files are loaded to the targeted archives, that operation staff are aware of loading exceptions and take the appropriate corrective actions, and that customer-agreed-to performance rules are being met.

Figure 2:
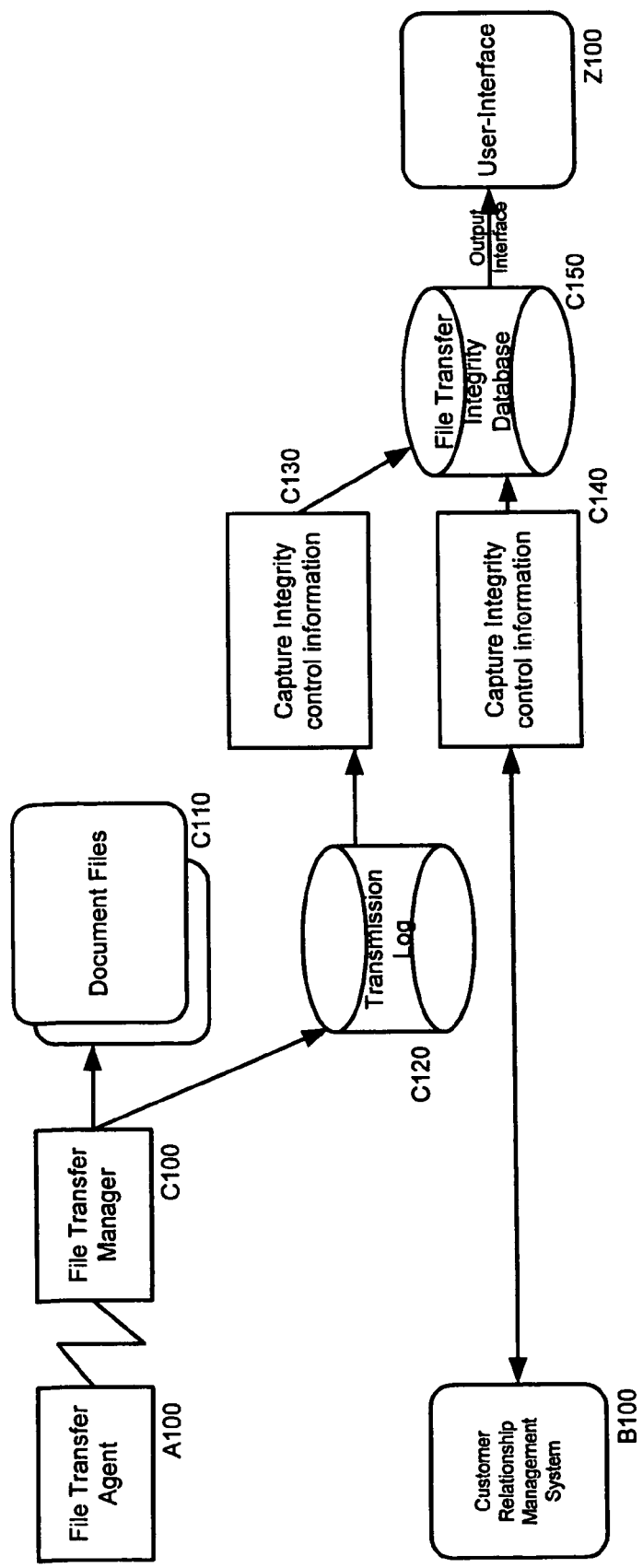
FIG. 2 illustrates the file transfer integrity manager application shown in FIG. 1 according to an embodiment of the invention.

As discussed with reference to FIGS. 1 and 2, the File Transfer Manager C100 stores incoming document files C110 in pre-defined staging sub-directories and records details of the file reception events in transmission log C120. The Routing and Distribution Manager ("RDM") D100 takes the document input files C110 and distributes them to the appropriate Archive Loading Managers E100. As the RDM D100 distributes the files, it records the distribution events in distribution log D120. Information stored in the distribution log D120 may include an identifier of the RDM D100; an identifier of the customer to which the file belongs; the date and time the RDM D100 reviewed, or registered, the file from the staging sub-directory; the date and time that the RDM D100 distributed the file, the staging sub-directory path name; the file name and size; the target archive location and name; the target landing zone name; whether the file is for the primary or a back-up archive; and the status of the distribution, such as successful or an error-code. If a file is marked for loading into both a primary and one or more back-up archives, the distribution log D120 will contain multiple tracking records for the same file.

When an Archive Loading Manager E100 receives a file from an RDM D100, it stores it into the appropriate location in the archive storage system F110, and records the event in an archiving loading log E120. The information loaded into the archive loading log E120 may include: an identifier of the customer to which the file belongs; the archive location, name, and directory; the file name and size; the date and time that loading began; the duration of the loading; and the status of the loading, such as successful or an error-code. If a file is loaded into both a primary and one or more back-up archives, the archiving loading log E120 contains multiple tracking records for the same file.

The Integrity Manager Database Update application P110 reconciles and combines the data in the transmission log C120, the distribution log D120, and the archive loading log E120, and loads the combined records into the end-to-end input file tracking database P120 to support reporting. The application P110 reconciles the logs C120, D120, E120 using the following rules. For each input file as recorded on log C120, there must be at least one record on log D120, indicating that every input file was distributed. For each record on log D120, there must be one matching tracking record on log E120, indicating that every distributed input file is loaded to an archive. And, all tracking records for a file must have the same size. Any violations of these rules may be communicated as an alarm to an operator via user-interface z100.

Besides reconciling the log files C120, D120, E120, FIIM P100 ensures that customer-agreed-to performance targets are being met via a service level agreement ("SLA") control database P130. An example customer-agreed-to performance targets may specify that, by 7:00 PM Easter Standard Time, all invoices must be loaded into the primary archive. Such rules are stored in the SLA Control Database P130. Table I below illustrates the format of the database P130 according to an embodiment of the invention.

TABLE I

| Customer or Customer Application | Primary or Secondary | Time Zone | Time Period | Severity 1 (Yellow) | Severity 2 (Orange) | Severity 3 (Red) |
|---|---|---|---|---|---|---|
| XYZ Corp - Invoices | Primary | US EST | 07:01-18:00 | 30 minutes | 45 minutes | 60 minutes |
| XYZ Corp - Invoices | Primary | US EST | 18:01-24:00 | 20 minutes | 240 minutes | 360 minutes |
| XYZ Corp - Invoices | Primary | US EST | 00:01-07:00 | 40 minutes | 45 minutes | 60 minutes |
| XYZ Corp - Invoices | Secondary | US EST | 07:01-18:00 | 120 minutes | 240 minutes | 360 minutes |
| XYZ Corp - Invoices | Secondary | US EST | 18:01-24:00 | 120 minutes | 240 minutes | 360 minutes |
| XYZ Corp - Invoices | Secondary | US EST | 00:01-07:00 | 120 minutes | 240 minutes | 360 minutes |

The data in Table I illustrates performance targets indicating when particular files should be loaded into primary and secondary archives. The three columns to the left indicate warning levels that arise when loading extends beyond the target time period by a certain amount of time. For instance, using row two of Table I, if the invoices are not loaded until 18:45 EST, an operator is alerted via user-interface Z100 with an orange color-coded signal, indicating a severity level of two. The FIIM P100 accesses the data in the database P120 to determine the amount of time it is taking to load files, and compares them to the target performance levels in the database P130.

Figure 9:
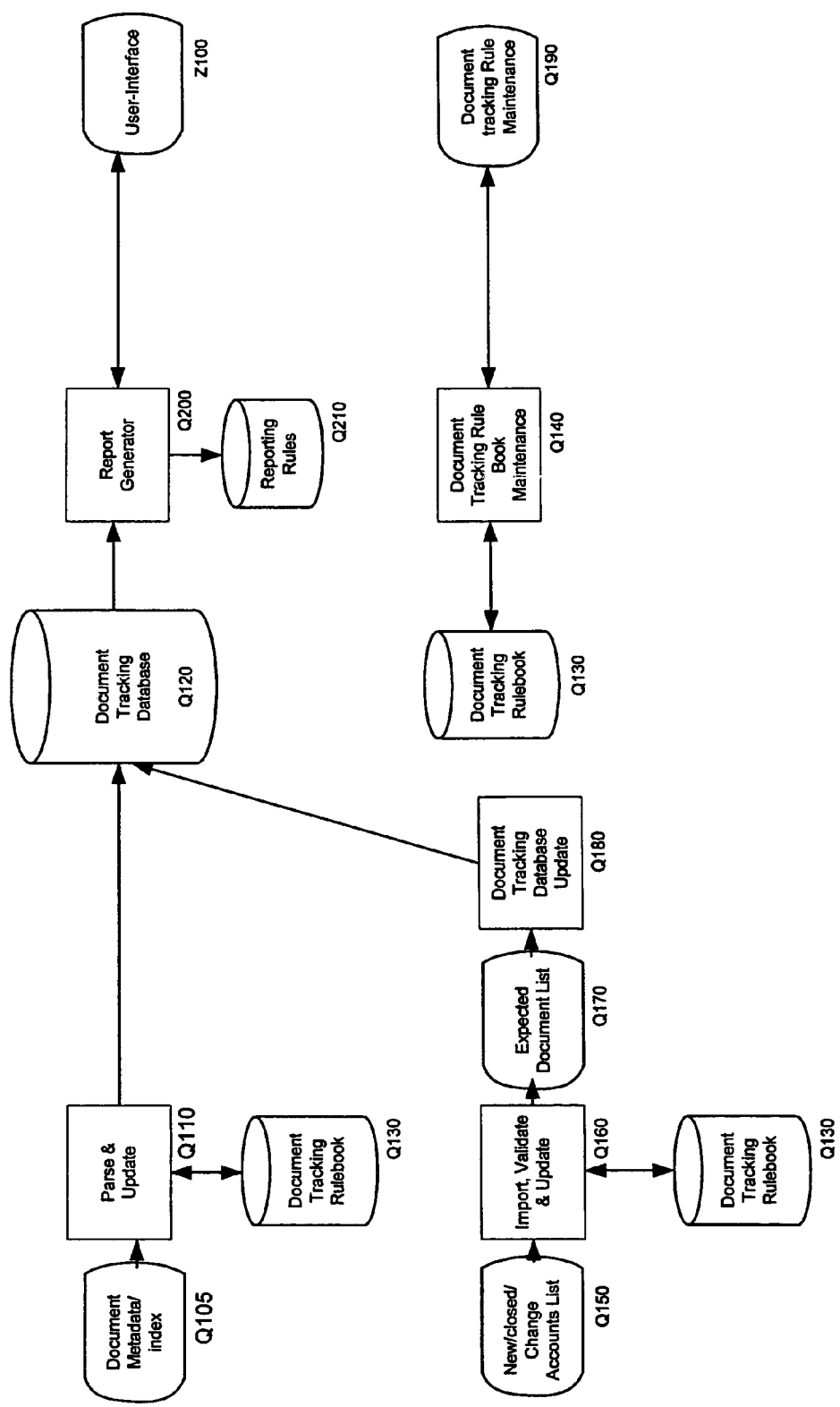
FIG. 9 illustrates the business content integrity manager application shown in FIG. 1 according to an embodiment of the invention.

FIG. 9 illustrates the operation of the Business Content Integrity Manager application ("BCIM") Q100 of FIG. 1. The BCIM Q100 controls the processes and data objects shown in FIG. 9 whose reference symbols begin with the letter "Q." Conventional archives have no awareness of the business rules associated with transactional documentation requirements. For example, a mortgage loan typically requires a minimum set of documents, such as a contract, survey map, loan agreement, etc., to be complete. The BCIM Q100 allows transaction types to be set up, where each transaction type can be defined to have a particular number of documents of different types. For example, a transaction type of "mortgage" may be specified to include a document of type "contract," a document of type "survey map," and a document of type "loan agreement."

Transaction types and the documents associated with each transaction type may be input or modified via a user-interface Q190, such as an on-line form. The changes from user-interface Q190 are processed by a Document Tracking Rulebook Maintenance application Q140, which incorporates the changes into a Document Tracking Rulebook database Q130. The database Q130 stores all of the transaction types and the documents associated with each transaction type. The information stored in the database Q130 may include, for each transaction type: a location in the archive reserved for documents associated with the transaction type; an identification of what customer or customers the transaction type is or are associated with; and the documents, including their types, required for the transaction type.

Once the transaction types have been arranged, a customer requests a new instance of a transaction type at Q150. Each instance may be assigned an account number and multiple instances may be requested via an account list. The request for a new instance is processed at Q160, and, with access to the data in the rulebook Q130, an expected document list Q170 is generated for each instance, or account. The Document Tracking Database Update application Q180 stores the new instance(s) with expected document list(s) in the document tracking database Q120. The database Q120, therefore, stores all instances of transaction types and their expected document lists.

Document index files Q105 are monitored to determine whether expected documents have been received. Index files may be transmitted to the BCIM Q100 by having the data capture system at the customer site 10 send the index files directly, by having the Routing and Distribution Manager D100 send the index files, or by having an extraction program extract the index records for newly loaded documents from the archive storage system F110. The index files are parsed to identify the types of each input document and the instance, or account, to which each document is associated. This parsing process may be aided by accessing the rulebook Q130. Once the document types and accounts have been identified, the document tracking database Q120 is updated.

Figure 10:
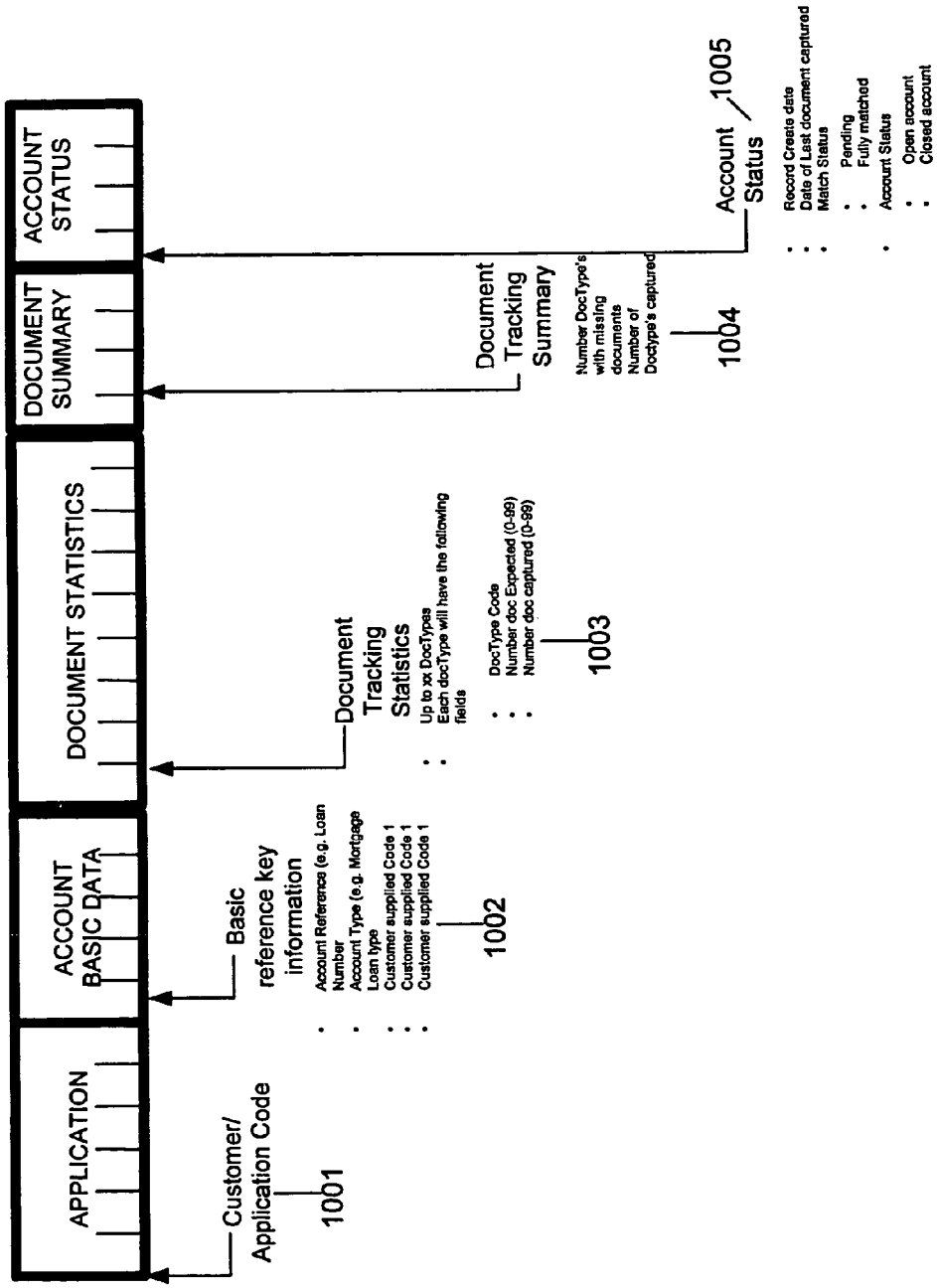
FIG. 10 illustrates a record in a document tracking database accessed by the business content integrity manager application illustrated with FIG. 9.

FIG. 10 illustrates a record in the document tracking database Q120 according to an embodiment of the invention. The application field 1001 is a customer identifier that may be used to group multiple accounts. For example, one application number may reference multiple loans associated with a particular customer. The account field 1002 identifies the account number (instance number), and the type of the account or transaction type, such as "loan." The document statistics field 1003 indicates the number of expected documents, by document type, and the number of documents received, by document type. The document summary field 1004 indicates the number of document types with missing documents. The account status field 1005 indicates the date the record was created, the date that the last document was received, whether or not all expected documents have been received, and whether the account is open or closed.

Reports based upon the database Q120 are generated by a reporting application Q200. The reports may be generated based upon reporting rules Q210. Examples of reporting rules may include listing all accounts with at least two missing documents and a last document captured date before date "X." Another rule may be to list all accounts that are missing documents of a particular type. Such reports may be displayed with a user-interface Z100.

Figure 11:
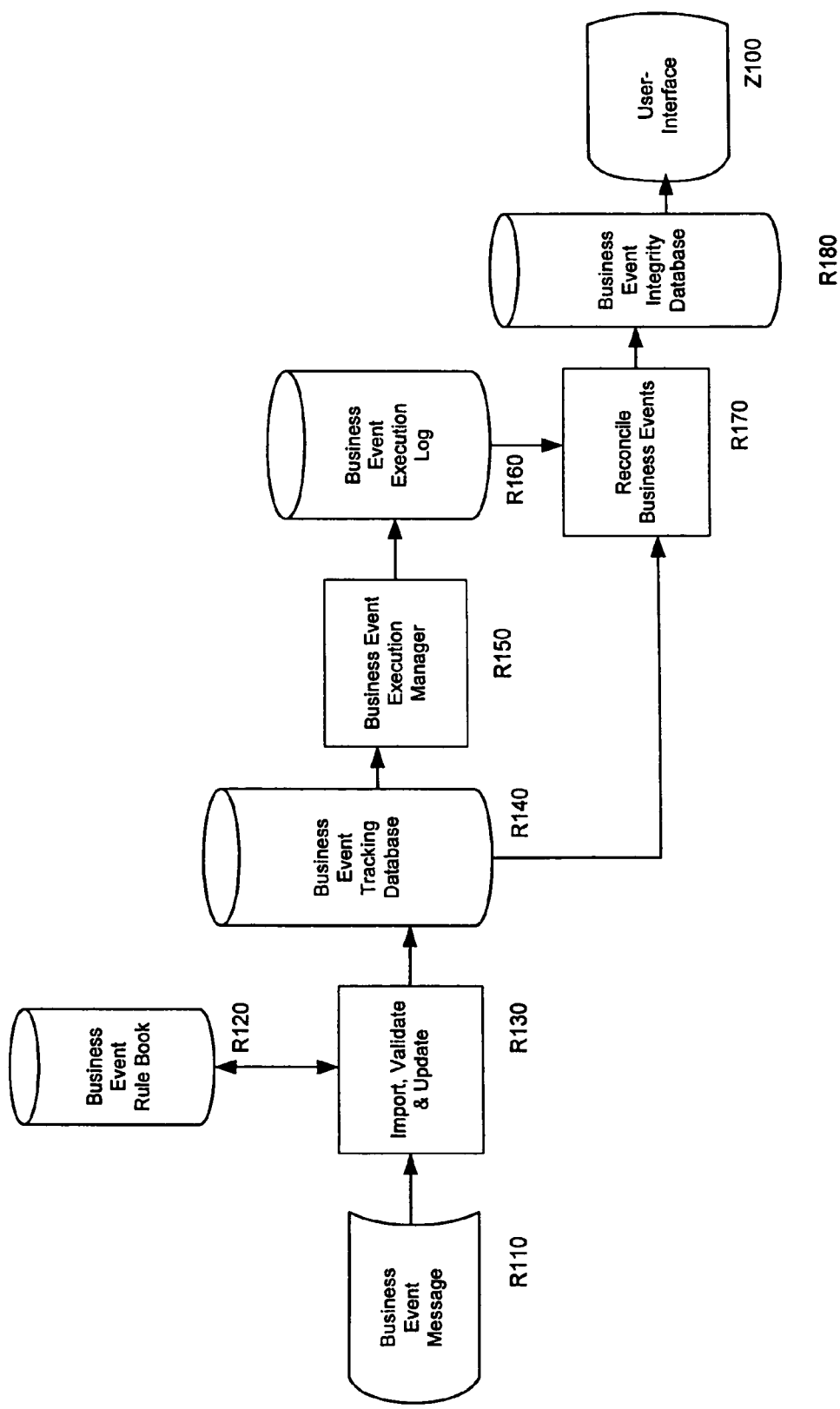
FIG. 11 illustrates the event integrity manager application shown in FIG. 1 according to an embodiment of the invention.

FIG. 11 illustrates the operation of the Business Event Integrity Manager application ("BEIM") R100 of FIG. 1. An example of a business event is the creation of an automatic e-mail to an account officer X days after the last required mortgage loan document is archived. Another example is a periodically run report, such as a report run every month to show all documents in a particular customer's folder that have payments over X dollars. The BEIM R100 executes a broad range of business events and employs a quality assurance mechanism to ensure that all planned business events are successfully executed. The BEIM R100 controls the processes and data objects shown in FIG. 9 whose reference symbols begin with the letter "R."

A new business event may be input as a message R110 into the BEIM R100 by an external application as one or more files or XML messages. Alternatively, a new business event message R110 may be input via an online form to facilitate ad hoc event setup and maintenance. The business event message R110 may include an assigned event tracking identifier; a message originator identifier and name; a customer identifier; and archive location and identifier; an archive application or folder name; an action code; action triggers, such as frequency, timing, or other trigger conditions; and detailed instructions regarding execution of the event.

An input, validate, and update application R130 receives each new business event message R110. The application R130 validates that the message R110 is coming from an authorized customer, that the message R110 has proper structure and contents, and that the event type, or action code, is an acceptable event type according to a business event rulebook database R120. The database R120 stores information regarding all acceptable business event types, such as automatic email generation or an archive query to pull select files from the archive. Once the application R120 validates the message R110, it stores the message R110 in the business event tracking database R140, which stores all business events to be executed.

One or more business event execution manager applications R150 monitor the business event tracking database R140 and execute business events when event action trigger conditions are met. The execution manager applications R150 may interface with other applications that ultimately perform execution of the event. In this situation, the execution manager applications R150 instruct the other applications to execute the business events. For instance, a report generation application may be instructed by an execution manager R150 to execute all report business events.

Upon execution of a business event, the associated execution manager R150 creates a record in the business event execution log R160. The record may include: an identifier of the business event execution manager R150 associated with the event execution; the date and time of execution of the event; the event tracking identifier; the associated message originator identifier and name; the customer identifier; the action code; and event execution status, such as successful or an error code.

A reconcile business events application R170 combines and reconciles the records between the business event tracking database R140 and business event execution log R160 to ensure that all planned events were successfully executed. The combined records are stored in a business event integrity database R180. Any discrepancies between the database R140 and the log R160 may be communicated as an alert to an operator via user-interface Z100.

According to one embodiment of the invention, the records in each of the databases discussed-above are stored in the archive storage system F110. For instance, the file transfer integrity database (C150, FIG. 2), document migration integrity database (J150, FIG. 3), document destruction database (K150, FIG. 4), document retrieval database (L150, FIG. 5), communication integrity manager database (M180, FIG. 6), retrieval health-check result database (N170, FIG. 7), end-to-end input file tracking database (P120, FIG. 8), document tracking database (Q120, FIG. 9), and business event integrity database (R180, FIG. 11), may all be archived to offer a long-term audit trail of all integrity manager processes and events.

Figure 12:
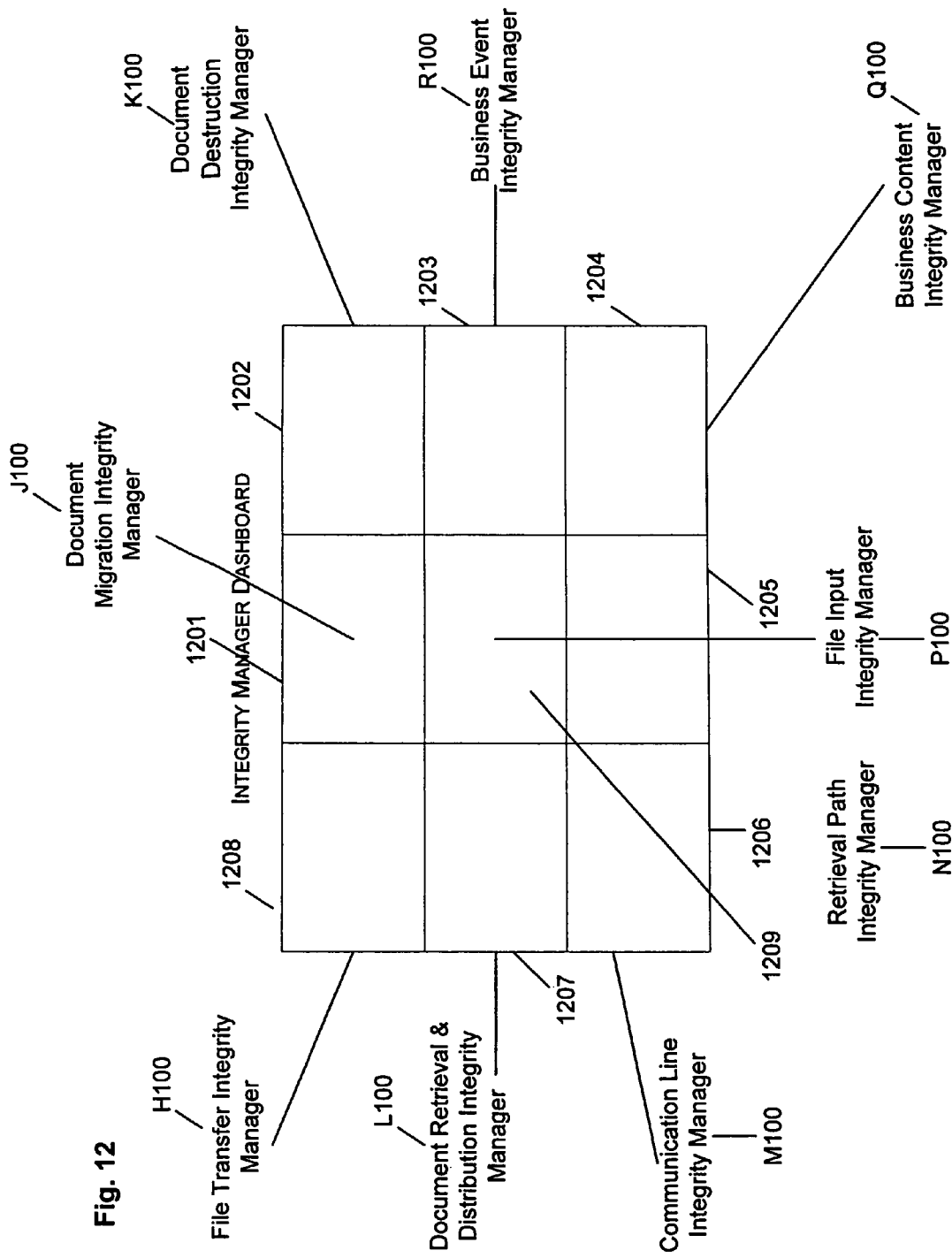
FIG. 12 illustrates a user-interface according to an embodiment of the invention.

FIG. 12 illustrates an embodiment of the user-interface Z100 according to an embodiment of the invention. The user-interface Z100 may be divided into sections 1201-1209, each associated with one of the manager applications shown in component 50 of FIG. 1. Each of these sections 1201-1209 may have a color associated with a performance level of the system monitored by the associated manager application. For example, when a system is performing properly, the color of the section associated with the manager application that monitors the system may be green. If a system is slightly malfunctioning, the color may be yellow. If the system is moderately malfunctioning, the color may be orange. And, if the system is severely malfunctioning, the color may be red.

For instance, if the File Transfer Integrity Manager H100 detects that a file scheduled to be transferred was not received, section 1208 associated with the File Transfer Integrity Manager H100 may have a yellow color. If two scheduled files were not received, section 1208 may be orange. If three or more scheduled files were not received, section 1208 may be red. The same or a similar strategy may be used for the sections of the user interface. Advantageously, an operator may customize the threshold levels associated with the different colors for each section 1201-1209.

According to an embodiment of the invention, the operator may select a section, e.g., with a mouse click known in the art, and have displayed any error messages pertaining to the system associated with the selected section. For instance, if the operator selects section 1208 when it is yellow, the user-interface displays information pertaining to the particular file that was not transferred, or not transferred successfully.

Also upon selecting one of the sections 1201-1209, the operator may be displayed a summary of the statistics of the associated system, e.g., number of file transfers for the last X hours when section 1208 is selected; detailed statistics, such as the contents of the file transfer integrity database C150 when section 1208 is selected; historical summary and detailed statistics for trend analysis.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A computer-readable-document archive system comprising: storage media for archiving computer-readable documents; an input interface for receiving documents to be archived; an output interface; a content integrity manager application that instructs a processor to perform actions comprising: (a) determining whether documents pertaining to a transaction have been received by the input interface based upon a comparison of at least data identifying a set of documents required for the transaction and data identifying documents associated with the transaction that have been received, and (b) transmitting a notification signal via the output interface, if at least one document in the set of documents has not been received; an event integrity manager application that instructs a processor to perform actions comprising: (a) executing predetermined events triggered by characteristics of the documents stored on the storage media, (b) recording results of the execution of the predetermined events, (c) determining whether the predetermined events have been executed successfully based upon a comparison of at least data identifying the predetermined events and the recorded results, and (d) transmitting a notification signal via the output interface, if at least one predetermined event did not successfully execute; and a document destruction integrity manager application that instructs a processor to perform actions comprising: (a) generating a document retention schedule, (b) interfacing with the retention schedule, (c) interfacing with an archive storage system, and (d) destroying the documents.

2. The archive system of claim 1, wherein transmitting a notification signal via the output interface, if at least one document in the set of documents has not been received, includes the step of determining if at least one document in the set has been received incorrectly.

3. A method for archiving, the method comprising the steps of: archiving computer-readable documents at a storage media; receiving documents to be archived at an input interface; instructing, by a content integrity manager application, a processor to perform actions comprising: (a) determining whether documents pertaining to a transaction have been received by the input interface based upon a comparison of at least data identifying a set of documents required for the transaction and data identifying documents associated with the transaction that have been received, and (b) transmitting a notification signal via the output interface, if at least one document in the set of documents has not been received; instructing, by an event integrity manager application, a processor to perform actions comprising: (a) executing predetermined events triggered by characteristics of the documents stored on the storage media, (b) recording results of the execution of the predetermined events, (c) determining whether the predetermined events have been executed successfully based upon a comparison of at least data identifying the predetermined events and the recorded results, and (d) transmitting a notification signal via an output interface, if at least one predetermined event did not successfully execute; and instructing, by a destruction integrity manager application, a processor to perform actions comprising: (a) generating a document retention schedule, based on one or more pre-determined purge rules, (b) interfacing with the retention schedule, (c) interfacing with an archive storage system, and (d) destroying the documents.

4. The method of claim 3, wherein the transaction comprises a loan transaction.

5. The method of claim 3, wherein the transaction comprises a mortgage loan transaction.

6. The method of claim 5, wherein the documents include a contract.

7. The method of claim 5, wherein the documents include a survey map.

8. The method of claim 5, wherein the documents include a loan agreement.

9. The method of claim 3, wherein the documents include a contract.

10. The method of claim 3, wherein the documents include a survey map.

11. The method of claim 3, wherein the documents include a loan agreement.

12. The archive system as in claims 3, further comprising: a user-interface communicatively connected to the output interface, wherein at the notification is displayed on the user-interface.

13. The archive system of claim 12, wherein the notification includes data indicating an error severity level.

14. The archive system of claim 13, wherein the user-interface displays a color associated with the error severity level.

15. The archive system of claim 14, wherein the user-interface includes a plurality of separate sections for displaying a plurality of notification signals.

* * * * *

UNITED STATES PATENT AND TRADEMARK OFFICE
CERTIFICATE OF CORRECTION

PATENT NO. : 7,617,261 B2  Page 1 of 1
APPLICATION NO. : 11/417582
DATED : November 10, 2009
INVENTOR(S) : Telkowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 794 days.

Signed and Sealed this

Nineteenth Day of October, 2010

David J. Kappos
*Director of the United States Patent and Trademark Office*